US011126205B2

(12) United States Patent
Miyakawa et al.

(10) Patent No.: US 11,126,205 B2
(45) Date of Patent: Sep. 21, 2021

(54) CONTROL OF FORMATION FLIGHT OF AIRCRAFT AND COMMUNICATION AREA FOR PROVIDING RADIO COMMUNICATION SERVICE

(71) Applicant: HAPSMobile Inc., Tokyo (JP)

(72) Inventors: Junichi Miyakawa, Tokyo (JP); Yoshihito Shimazaki, Kanagawa (JP); Makoto Saitou, Chiba (JP); Yuta Miwa, Chiba (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/095,760

(22) Filed: Nov. 12, 2020

(65) Prior Publication Data

US 2021/0072772 A1 Mar. 11, 2021

Related U.S. Application Data

(63) Continuation of application No. PCT/JP2019/023579, filed on Jun. 13, 2019.

(30) Foreign Application Priority Data

Jun. 22, 2018 (JP) .............................. JP2018-119266

(51) Int. Cl.
*G05D 1/10* (2006.01)
*B64C 1/36* (2006.01)
(Continued)

(52) U.S. Cl.
CPC .............. *G05D 1/104* (2013.01); *B64C 1/36* (2013.01); *G08G 5/0026* (2013.01); *H04B 7/18506* (2013.01)

(58) Field of Classification Search
CPC . G05D 1/104; G05D 1/10; B64C 1/36; B64C 13/18; B64C 19/02; B64C 39/02;
(Continued)

(56) References Cited

U.S. PATENT DOCUMENTS 7,970,532 B2 * 6/2011 Tehan .................. G05D 1/0646
701/423
8,315,794 B1 * 11/2012 Strelow .................. G05D 1/104
701/412
(Continued)

FOREIGN PATENT DOCUMENTS

JP 2002211496 A 7/2002
JP 2003523870 A 8/2003

OTHER PUBLICATIONS

Decision to Grant a Patent issued for counterpart Japanese Application No. 2018-119266, issued by the Japanese Patent Office dated Dec. 24, 2019 (drafted on Dec. 16, 2019).
(Continued)

*Primary Examiner* — Mussa A Shaawat

(57) ABSTRACT

A control device is provided which forms a communication area on a ground to control an aircraft having an antenna for providing a radio communication service to a user terminal in the communication area. The control device includes a control unit that makes a plurality of aircrafts fly in formation, and controls the plurality of aircrafts such that the communication area of each of the plurality of aircrafts moves while covering a part of a preset target area and the entire target area is covered by a plurality of the communication areas of the plurality of aircrafts.

16 Claims, 13 Drawing Sheets

(51) Int. Cl.
*G08G 5/00* (2006.01)
*H04B 7/185* (2006.01)

(58) Field of Classification Search
CPC .. G08G 5/0026; G08G 5/0013; G08G 5/0021; G08G 5/0034; G08G 5/006; G08G 5/0043; G08G 5/0069; H04B 7/18506; H04W 84/06
See application file for complete search history.

(56) References Cited

U.S. PATENT DOCUMENTS

| | | | | |
|---|---|---|---|---|
| 8,543,265 | B2* | 9/2013 | Ekhaguere | G08G 5/0086 701/11 |
| 10,593,109 | B1* | 3/2020 | Floyd | G05D 1/0094 |
| 2003/0141409 | A1 | 7/2003 | Lisoski | |
| 2008/0243372 | A1* | 10/2008 | Bodin | G08G 5/0069 701/23 |
| 2014/0249693 | A1* | 9/2014 | Stark | B64D 47/02 701/2 |
| 2015/0236778 | A1 | 8/2015 | Jalali | |
| 2016/0046387 | A1 | 2/2016 | Frolov | |
| 2016/0134358 | A1 | 5/2016 | Jalali | |
| 2016/0156406 | A1* | 6/2016 | Frolov | H04W 16/28 455/431 |
| 2020/0028570 | A1* | 1/2020 | Miyakawa | H04B 7/18504 |
| 2020/0119805 | A1* | 4/2020 | Miyakawa | H04B 10/1129 |
| 2020/0380874 | A1* | 12/2020 | Fujii | B64D 47/02 |

OTHER PUBLICATIONS (ISA/237) Written Opinion of the International Search Authority for International Patent Application No. PCT/JP2019/023579, mailed by the Japan Patent Office dated Aug. 6, 2019.

* cited by examiner

CONTROL OF FORMATION FLIGHT OF AIRCRAFT AND COMMUNICATION AREA FOR PROVIDING RADIO COMMUNICATION SERVICE

The contents of the following Japanese and PCT applications are incorporated herein by reference:
NO. 2018-119266 filed in JP on Jun. 22, 2018, and
NO. PCT/JP2019/023579 filed in WO on Jun. 13, 2019.

BACKGROUND

1. Technical Field

The present invention relates to a control device, a program, and an aircraft.

2. Related Art

An aircraft has been known which has an antenna and flies in the stratosphere in order to provide a stratosphere platform (for example, see Patent Literature 1).

CITATION LIST

Patent Literature

Patent Literature 1: Japanese Patent Application Publication 2002-211496

It is desirable to provide a technology that can improve the convenience of a radio communication service using an aircraft.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
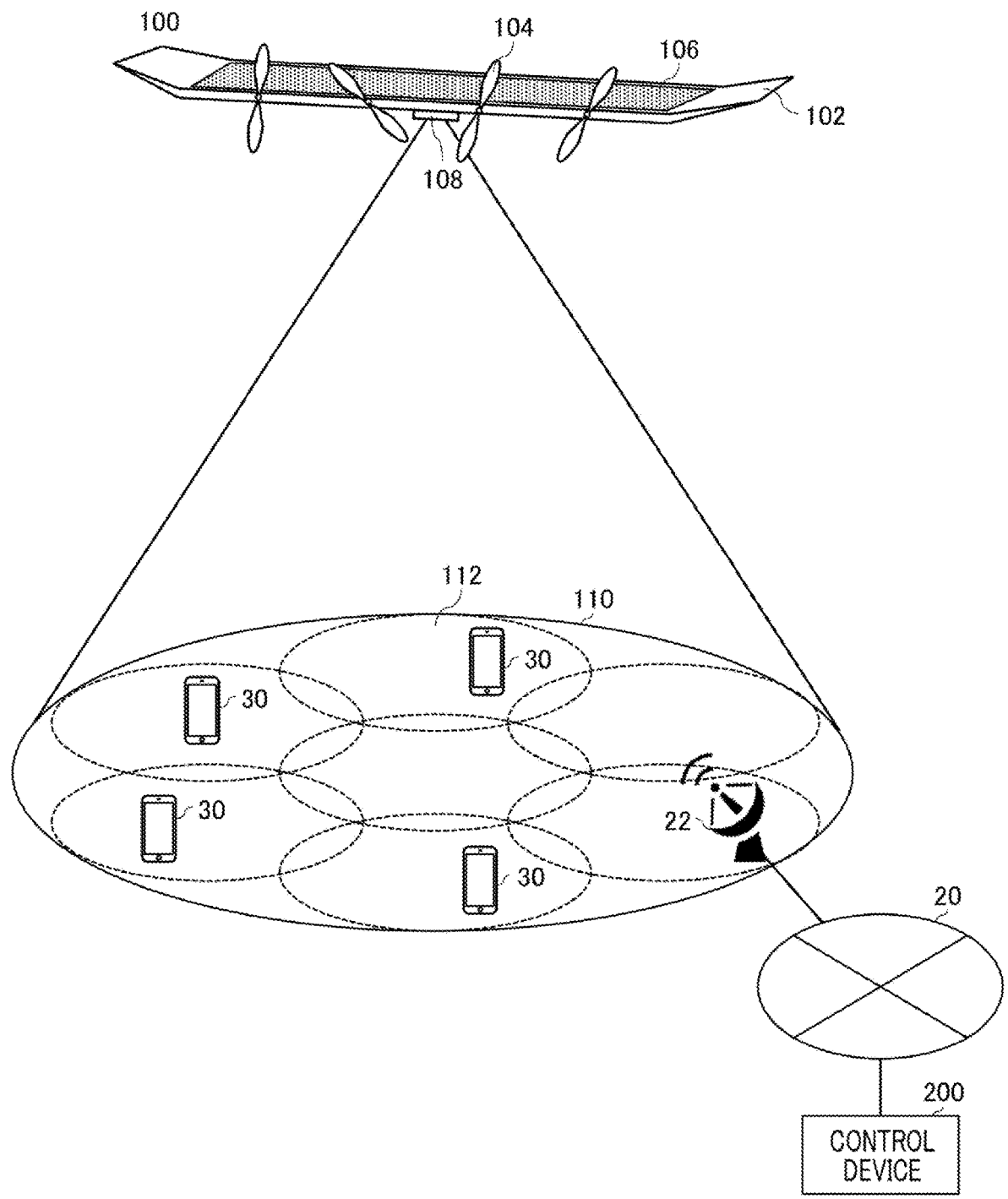
FIG. 1 schematically illustrates an example of an aircraft 100.

FIG. 1 schematically illustrates an example of an aircraft 100. The aircraft 100 includes a main body 102, a propeller 104, a solar cell panel 106, and an antenna 108. The aircraft 100 flies using the propeller 104 driven with power generated by the solar cell panel 106.

The aircraft 100 forms a communication area 110 on the ground using the antenna 108 to provide a radio communication service to a user terminal 30 in the communication area 110. The antenna 108 may be a multi-beam antenna for example, and the communication area 110 may be configured by a plurality of sub cells 112. The aircraft 100 flies, for example, in the stratosphere to provide the radio communication service to the user terminal 30 on the ground. The aircraft 100 may function as a stratosphere platform.

Any terminal may be used for the user terminal 30 as long as the terminal is a communication terminal that can communicate with the aircraft 100. For example, the user terminal 30 is a portable phone such as a smart phone. The user terminal 30 may be a tablet terminal, a PC (Personal Computer), and the like.

The aircraft 100 relays communication between, for example, the user terminal 30 and a network 20 on the ground to provide the radio communication service to the user terminal 30. The network 20 may include a core network which is provided by a communication service provider. In addition, the network 20 may include the Internet.

The aircraft 100 communicates with the network 20 via a gateway 22 in the communication area 110 among the gateways 22 arranged in various places on the ground. In addition, for example, the aircraft 100 may communicate with the network 20 via a communication satellite (not illustrated).

The aircraft 100 transmits, for example, data received from the user terminal 30 in the communication area 110 to the network 20. In addition, for example, when receiving the data addressed to the user terminal 30 in the communication area 110 via the network 20, the aircraft 100 transmits the data to the user terminal 30.

The aircraft 100 may be controlled by a control device 200. For example, the aircraft 100 flies according to instructions which are transmitted by the control device 200 via the network 20 and the gateway 22.

The control device 200 controls the aircraft 100 by transmitting the instructions. The control device 200 instructs the aircraft 100 with a flight pattern, with a flight speed, with the size of the communication area 110, or with the shape of the communication area 110 to control the aircraft 100. The control device 200 may control the plurality of aircrafts 100. The control device 200 may make the plurality of aircrafts 100 fly in formation.

Figure 2:
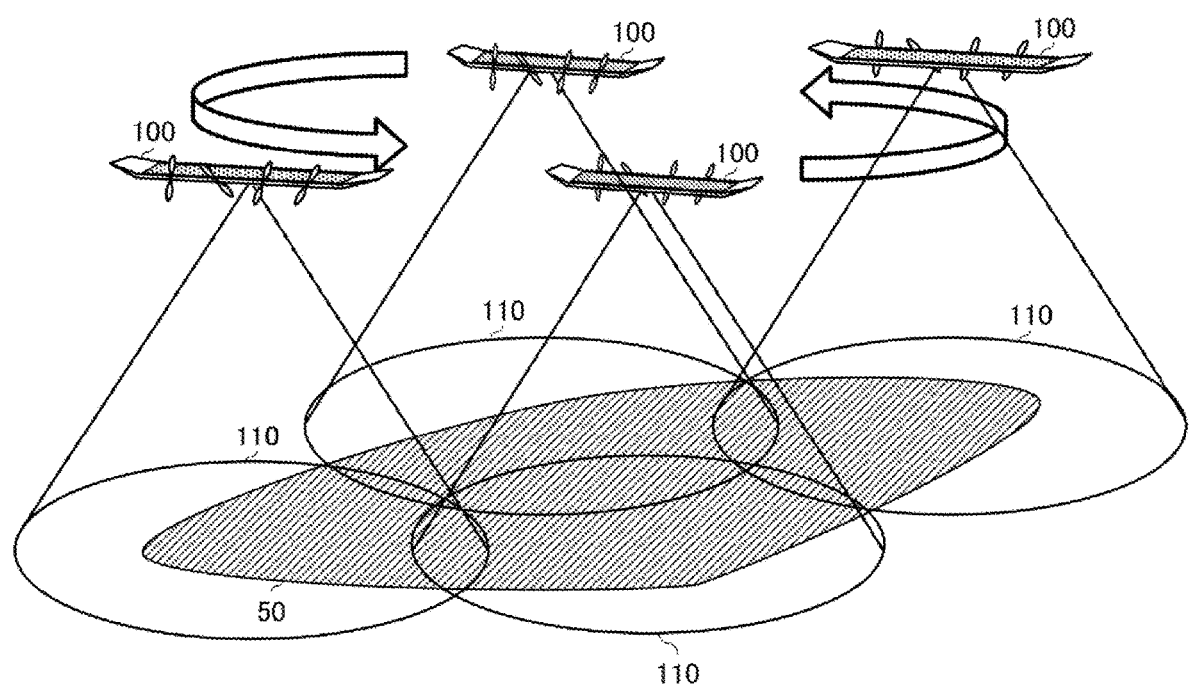
FIG. 2 schematically illustrates an example in which a plurality of aircrafts 100 fly in formation.

FIG. 2 schematically illustrates an example in which the plurality of aircrafts 100 fly in formation. The control device 200 may control the plurality of aircrafts 100 such that the communication area 110 of each of the plurality of aircrafts 100 moves while covering a part of a preset target area 50, and the entire target area 50 is covered by the communication areas 110 of the plurality of aircrafts 100. In the example illustrated in FIG. 2, the plurality of aircrafts 100 are circulating around a circular flight route.

The target area 50 may be arbitrarily set. The target area 50 is set, for example, in a country-by-country basis. In addition, the target area 50 may be set, for example, in various classification units defined in each country such as prefectures, municipalities, and the like in Japan. In addition, the target area 50 may not be corresponding to such a segment, but may be an arbitrarily set area. The target area 50 may be set by, for example, a manager of the aircraft 100, a manager of the control device 200, or the like.

The control device 200 may receive position information indicating each position of the plurality of aircrafts 100 from each of the plurality of aircrafts 100 to grasp the positions of the plurality of aircrafts 100. Then, the control device 200 may control the plurality of aircrafts 100 on the basis of the positions of the plurality of aircrafts 100 such that the communication area 110 of each of the plurality of aircrafts 100 moves while covering a part of a preset target area 50, and the entire target area 50 is covered by the communication areas 110 of the plurality of aircrafts 100.

Further, the formation flight of the plurality of aircrafts 100 may be realized autonomously by the plurality of aircrafts 100. For example, the plurality of aircrafts 100 receives the information of the target area 50 from the control device 200. Then, the plurality of aircrafts 100 communicates with each other to grasp each position, and controls each own flight such that the communication area 110 of each of the plurality of aircrafts 100 each moves while covering a part of the preset target area 50, and the communication areas 110 of the plurality of aircrafts 100 cover the entire target area 50.

The plurality of aircrafts 100 may communicate according to any communicate protocol. The plurality of aircrafts 100 communicate, for example, by optical communication. The plurality of aircrafts 100 may communicate via the gateway 22 and the network 20. In addition, the plurality of aircrafts 100 may communicate via a communication satellite.

Figure 3:
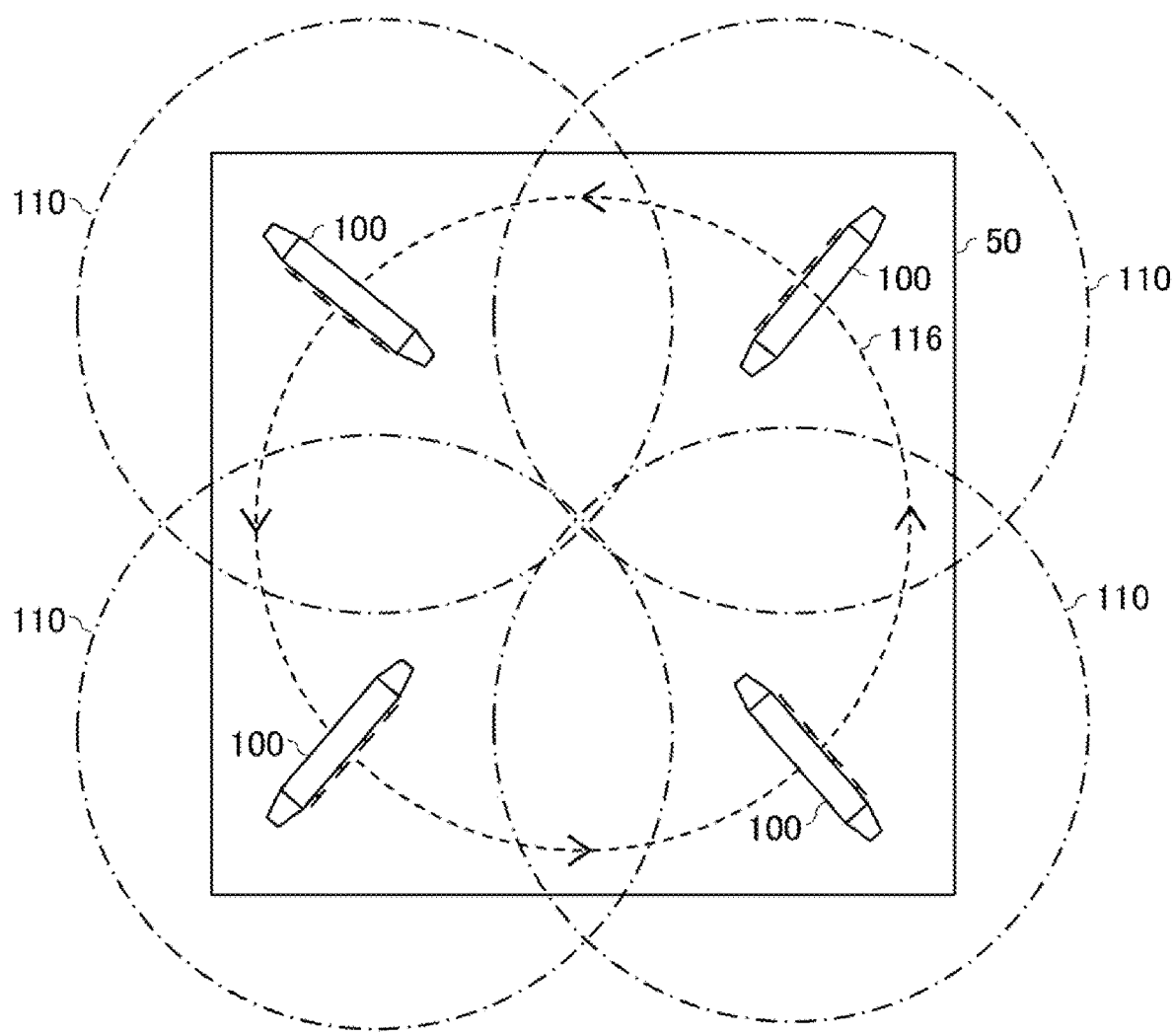
FIG. 3 schematically illustrates an example in which the plurality of aircrafts 100 fly in formation.

FIG. 3 schematically illustrates an example in which the plurality of aircrafts 100 fly in formation. FIG. 3 schematically illustrates a situation in which the plurality of aircrafts 100 are viewed from above. In FIG. 3, a case where the plurality of aircrafts 100 fly in a common flight pattern 116 is exemplified.

The flight pattern 116 illustrated in FIG. 3 is not limited to the circular shape, but may be any shape such as an elliptical shape, an 8-like shape, and the like. The flight pattern 116 of the plurality of aircrafts 100 may be arbitrarily set in accordance with the shape of the target area 50.

The control device 200 may have an aircraft other than the plurality of aircrafts 100 participate in the formation flight of the plurality of aircrafts 100 according to a preset condition being satisfied while the plurality of aircrafts 100 cover the entire target area 50.

Figure 4:
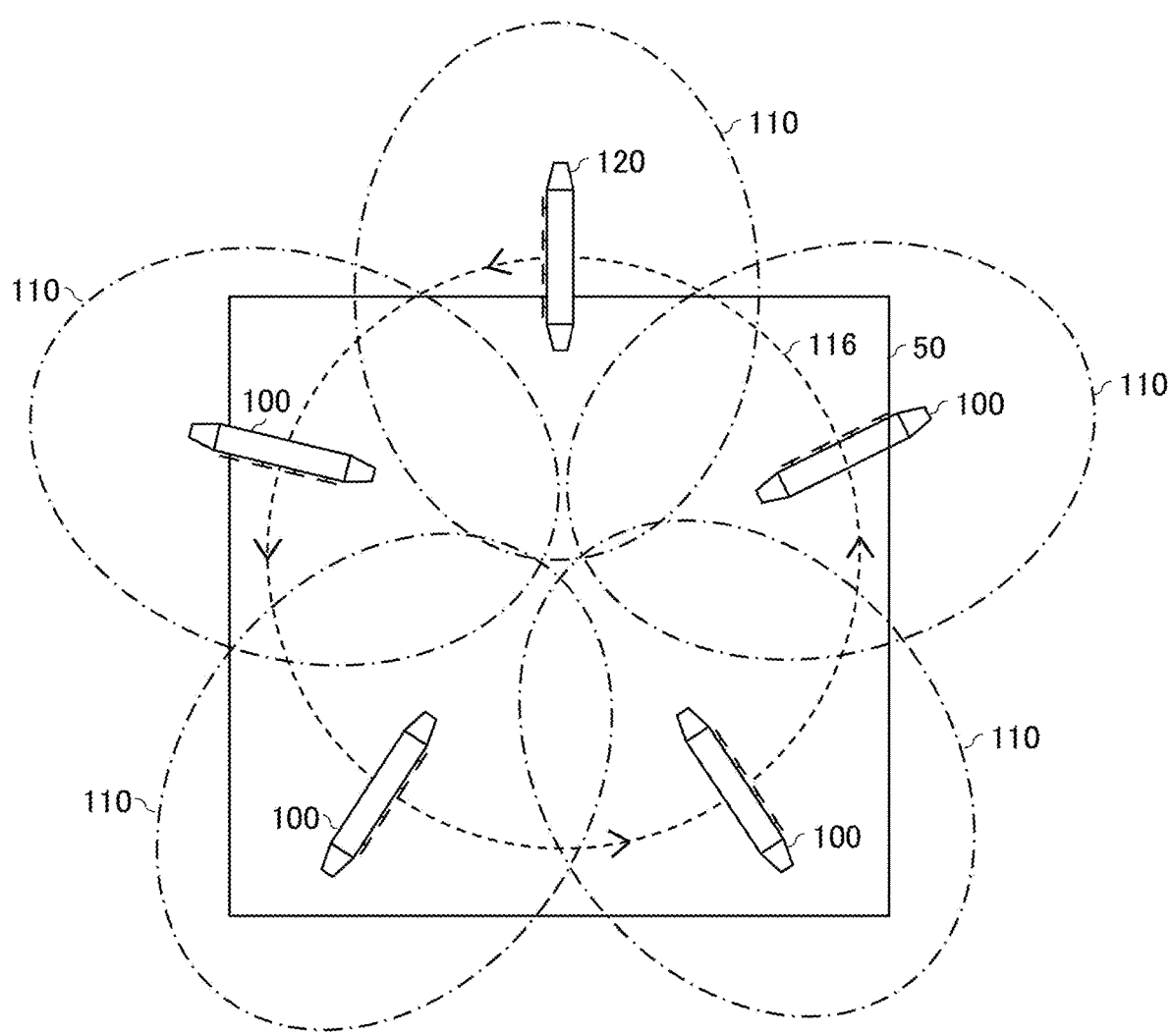
FIG. 4 schematically illustrates an example in which the plurality of aircrafts 100 and an aircraft 120 fly in formation.

FIG. 4 schematically illustrates an example in which the plurality of aircrafts 100 and an aircraft 120 fly in formation. For example, according to the determination that the communication traffic in the target area 50 is higher than a preset threshold, the control device 200 transmits an instruction to the aircraft 120 and the plurality of aircrafts 100 to have the aircraft 120 participate in the formation flight of the plurality of aircrafts 100. The case that the communication traffic in the target area 50 is higher than the preset threshold is an example of a preset condition.

The control device 200 instructs, for example, the aircraft 120 and the plurality of aircrafts 100 about the arrangement of the aircraft 120 in the formation flight. In addition, for example, the control device 200 makes the plurality of aircrafts 100 change the shape of the communication area 110 as the aircraft 120 participates in the formation flight. The control device 200 changes, for example, the shape of the communication area 110 to be reduced in size of the communication area 110 since the width of the communication area 110 is narrowed along the advancing direction of the aircraft 100. The control device 200 may change, for example, the shape of the communication area 110 into an elliptical shape as illustrated in FIG. 4 in a case where the original shape of the communication area 110 is the circular shape as illustrated in FIG. 3. In this way, the size of the communication area 110 is made smaller, so that the available communication capacity for the user terminal 30 can be increased by the aircraft 100.

The aircraft 120 added to the formation flight of the plurality of aircrafts 100 may be, for example, a spare aircraft of the plurality of aircrafts 100. The spare aircraft may be an aircraft on standby for replacement with the aircraft 100 in a case where a failure, a defect, or the like occurs in any one of the plurality of aircrafts 100. In addition, the spare aircraft may be an aircraft on standby for the purpose of reducing power consumption in any one of the plurality of aircrafts 100 at night. The power generation amount by sunlight is significantly reduced at night. Therefore, during that time, the aircraft 100 and the spare aircraft are replaced for the spare aircraft to provide the communication service, and the communication of the aircraft 100 is stopped, so that the power consumption can be lowered. The spare aircraft, which is waiting in such applications, is temporarily added to the formation flight of the plurality of aircrafts 100, so that the communication capacity can be temporarily increased.

The spare aircraft may be on standby, for example, in the sky at the center of the flight pattern 116 of the plurality of aircrafts 100. In addition, the spare aircraft may be on standby at a position other than the flight pattern 116 in the sky. In addition, the spare aircraft may be on standby on the ground.

In addition, the aircraft 120 which is added to the formation flight of the plurality of aircrafts 100 may be, for example, at least one aircraft 100 among a plurality of aircrafts 100 which are flying in formation separately from the plurality of aircrafts 100. For example, in a case where a plurality of formation flights are realized, at least one aircraft 100 of the plurality of aircrafts 100 which are included in the formation flight where the communication traffic of the target area is least among the plurality of formation flights is moved to the formation flight of the plurality of aircrafts 100.

In FIG. 4, the description has been given about a case where the aircraft 120 participates in the formation flight according to a change in the communication traffic in the target area 50, but the invention is not limited thereto. The flight speed of some aircrafts 100 among the plurality of aircrafts 100 may be changed, or the shape of the communication area 110 may be changed.

Figure 5:
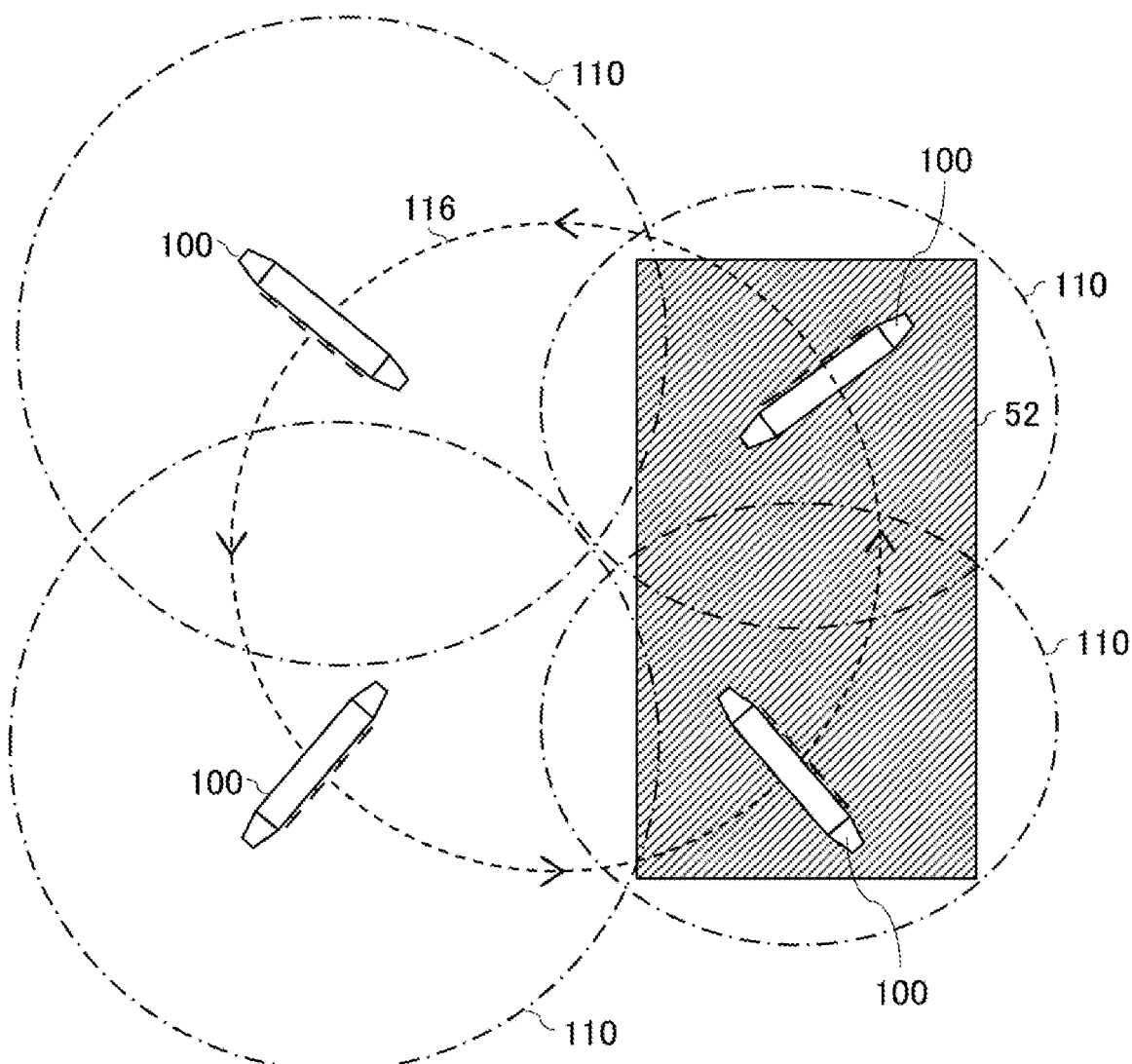
FIG. 5 schematically illustrates an example in which the plurality of aircrafts 100 fly in formation.

FIG. 5 schematically illustrates an example in which the plurality of aircrafts 100 fly in formation. Herein, the flight speed of the aircraft 100 covering a specific partial area in the target area 50 is made slower than that of the aircraft 100 covering another area, and the size of the communication area 110 of the aircraft 100 covering the specific area is made smaller for example. In FIG. 5, as an example of a specific partial area in the target area 50, a high traffic area 52 in the target area 50 is exemplified which has a communication traffic, due to a plurality of user terminals 30, being heavier than the other areas and larger than a preset threshold.

The control device 200 may lower the flight speed of the aircraft 100 covering the high traffic area 52 more than the flight speed of the other aircrafts 100 in a case where the high traffic area 52 appears. The control device 200 sets, for example, the flight speed when flying on the high traffic area 52, gradually lowers the flight speed of the aircraft 100 before or after the communication area 110 of the aircraft 100 flying along the flight pattern 116 enters the high traffic area 52, maintains the flight speed when the flight speed reaches a set value, and gradually returns the flight speed of the aircraft 100 to the original flight speed before or after the communication area 110 leaves the high traffic area 52. In this way, it is possible to suppress the handover of the user terminal 30 on the high traffic area 52 by lowering the flight speed when flying on the high traffic area 52.

The control device 200 may set the flight speed when flying on the high traffic area 52 according to the communication traffic of the high traffic area 52. For example, the control device 200 sets the flight speed lower as the communication traffic of the high traffic area 52 is higher.

In addition, the control device 200 may change the shape of the communication area 110 of the aircraft 100 covering the high traffic area 52 to make the size of the communication area 110 smaller in a case where the high traffic area 52 appears. The control device 200 sets, for example, the shape of the communication area 110 when flying on the high traffic area 52, gradually changes the communication area 110 of the aircraft 100 to the set shape before or after the communication area 110 of the aircraft 100 flying along the flight pattern 116 enters the high traffic area 52, and gradually returns the shape of the communication area 110 to the original shape before or after the communication area 110 leaves the high traffic area 52. As a result, it is possible to increase the communication capacity.

The control device 200 may set the size of the communication area 110 when flying on the high traffic area 52 according to the communication traffic of the high traffic area 52. For example, the control device 200 sets the size smaller as the communication traffic of the high traffic area 52 is higher.

Further, the control device 200 may change the flight pattern 116 in a case where the high traffic area 52 appears. The control device 200 changes a part of the flight pattern 116, for example, in order to increase the time when each of the plurality of aircrafts 100 flies on the high traffic area 52.

The control device 200 may control the plurality of aircrafts 100 in order not to change the size of the total area covered by the plurality of communication areas 110 of the plurality of aircrafts 100. For example, in a case where the control device 200 makes the flight speed of the aircraft 100 covering the high traffic area 52 lower, or makes the size of the communication area 110 smaller, the sizes of the communication areas 110 of the other aircrafts 100 may be increased. In addition, the control device 200 may adjust the flight speeds of the other aircrafts 100.

Further, the changing of the flight speed of the aircraft 100, the changing of the communication area 110, and the changing of the flight pattern 116 may be performed mainly by the plurality of aircrafts 100 rather than the control device 200. For example, the plurality of aircrafts 100 may adjust the flight speeds of each other such that the flight speed of the aircraft 100 covering the high traffic area 52 becomes lower than the flight speeds of the other aircrafts 100 in a case where the high traffic area 52 appears. In addition, the aircraft 100 covering the high traffic area 52 among the plurality of aircrafts 100 may have a small size of the communication area 110 during flying over the high traffic area 52. In addition, in response to the emergence of the high traffic area 52, the plurality of aircrafts 100 may communicate with each other to determine the change of the flight pattern 116, and fly along the flight pattern 116.

In FIG. 5, the description has been given about an example in which the flight speed of the aircraft 100, the size of the communication area 110, and the like are changed in a case where the high traffic area 52 appears. However, the aircraft 120 other than the plurality of aircrafts 100 flying in formation may be further added to the formation flight.

Figure 6:
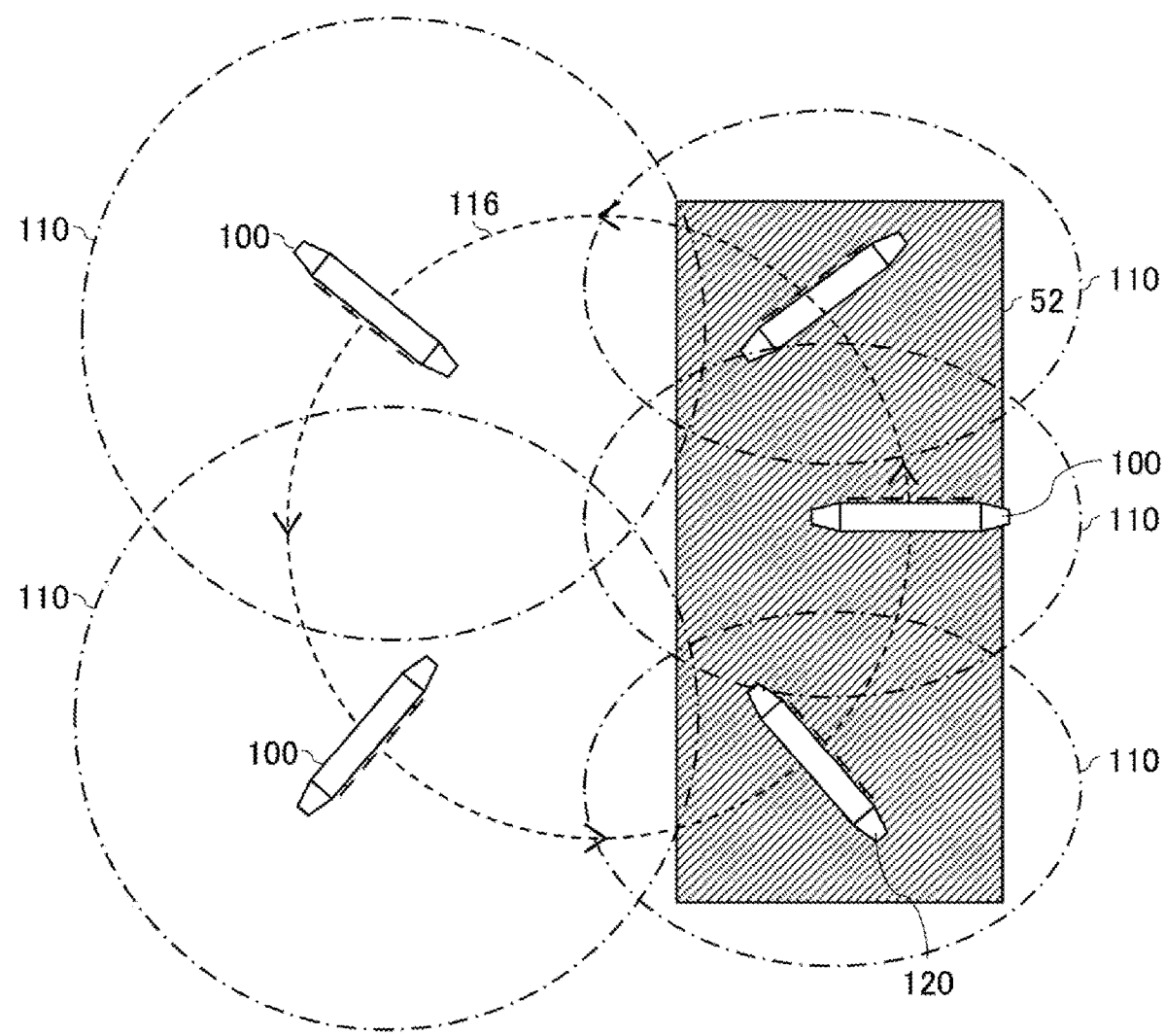
FIG. 6 schematically illustrates an example in which the plurality of aircrafts 100 and the aircraft 120 fly in formation.

FIG. 6 schematically illustrates an example in which the plurality of aircrafts 100 and the aircraft 120 fly in formation. In response to the emergence of the high traffic area 52, the control device 200 adds the aircraft 120 to the formation flight, makes the flight speed of the aircraft 100 covering the high traffic area 52 lower, and makes the size of the communication area 110 of the aircraft 100 covering the high traffic area 52 smaller. As a result, it is possible to increase the communication capacity in the high traffic area 52. In addition, it is possible to reduce the number of handovers in the high traffic area 52.

Figure 7:
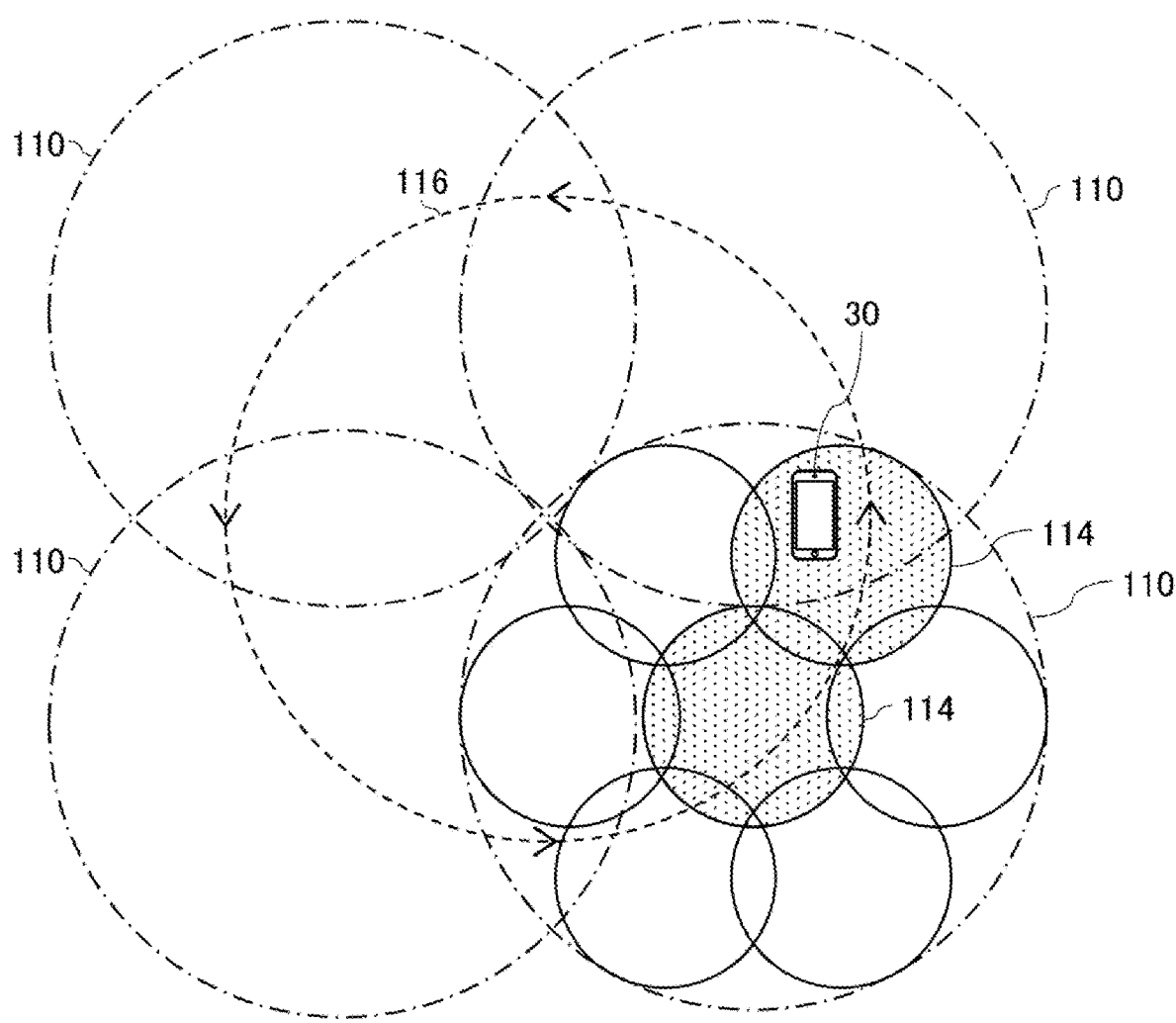
FIG. 7 schematically illustrates an example of the configuration of a plurality of sub cells 112.

FIG. 7 schematically illustrates an example of the configuration of the plurality of sub cells 112. The control device 200 may construct a virtual cell in two or more sub cells 112 among the plurality of sub cells 112 included in the communication area 110 formed by one aircraft 100. A technique of constructing the virtual cell may be employed in which the plurality of sub cells 112 are considered as one cell by assigning the same frequency band thereto.

The control device 200 may construct the virtual cell in two or more sub cells 112 depending on the moving direction of two or more sub cells among the plurality of sub cells 112 in one communication area 110. For example, the control device 200 constructs the virtual cell in the plurality of sub cells 112, which pass through over the same area, among the plurality of sub cells 112. FIG. 7 illustrates an example of the state where a virtual cell 114 is constructed in two sub cells 112 among the plurality of sub cells 112.

The two virtual cells 114 illustrated in FIG. 7 pass through the position of the user terminal 30 illustrated in FIG. 7. In a case where the virtual cell 114 is not constructed, the handover of the user terminal 30 occurs when the user terminal 30 passes through one sub cell 112 among the two sub cells 112 and enters the next sub cell 112. In contrast, it is possible not to cause the handover by constructing the virtual cell 114 in the two sub cells 112. That is, it is possible to lower the number of handovers.

Further, the constructing of the virtual cell 114 illustrated in FIG. 7 may be performed mainly by the plurality of aircrafts 100 rather than the control device 200. The aircraft 100 may construct the virtual cell in two or more sub cells 112 depending on the moving direction of two or more sub cells 112 among the plurality of sub cells 112 which are formed by the aircraft 100.

Figure 8:
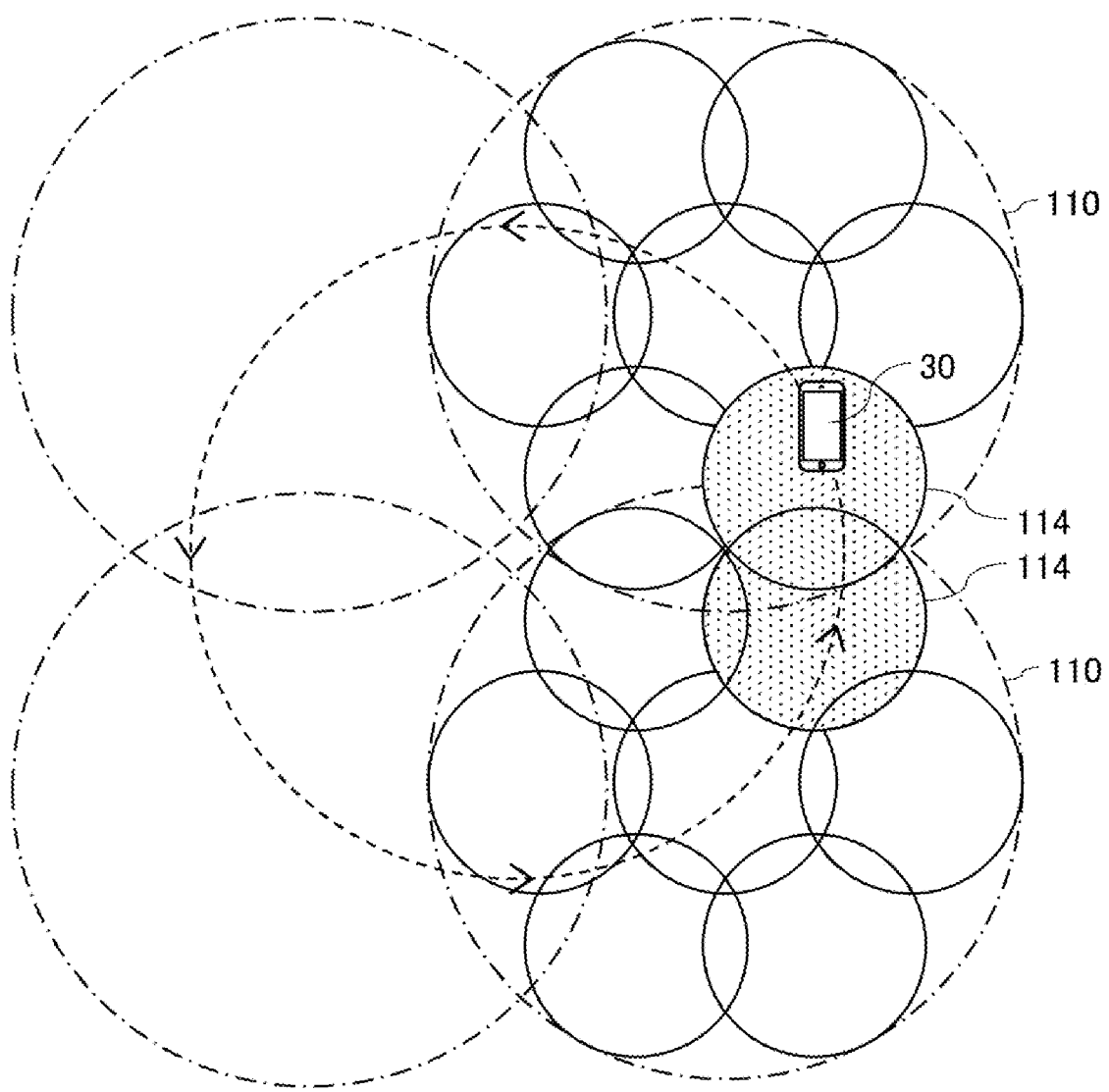
FIG. 8 schematically illustrates an example of the configuration of the plurality of sub cells 112.

FIG. 8 schematically illustrates an example of the configuration of the plurality of sub cells 112. In FIG. 7, the description has been given about an example in which the virtual cell is constructed in two or more sub cells 112 among the plurality of sub cells 112 in one communication area 110. However, the control device 200 may construct the virtual cell 114 in the sub cell 112 in a different communication area 110. In the example illustrated in FIG. 8, the control device 200 constructs the virtual cell in the sub cell 112 in a first communication area 110 and the sub cell 112 in a second communication area 110 depending on the moving direction of the sub cell 112 in a first communication area 110 by a first aircraft 100 among the plurality of aircrafts 100 and the sub cell 112 in a second communication area 110 by a second aircraft 100 among the plurality of aircrafts 100.

Two virtual cells 114 illustrated in FIG. 8 pass through the position of the user terminal 30 illustrated in FIG. 8. In a case where the virtual cell 114 is not constructed, the handover of the user terminal 30 occurs when the user terminal 30 passes through one sub cell 112 among the two sub cells 112 and enters the next sub cell 112. In contrast, it is possible not to cause the handover by constructing the virtual cell 114 in the two sub cells 112. That is, it is possible to lower the number of handovers.

Further, the constructing of the virtual cell 114 illustrated in FIG. 8 may be performed mainly by the plurality of aircrafts 100 rather than the control device 200. The aircraft 100 may determine to construct a virtual cell in the sub cell 112 formed by the aircraft 100 and the sub cell 112 formed by the other aircraft 100 depending on the moving direction of the plurality of sub cells 112 formed by the aircraft 100 and the plurality of sub cells 112 formed by the other aircraft 100, and construct the virtual cell by communicating with each other to assign the same frequency band to these sub cells 112.

Figure 9:
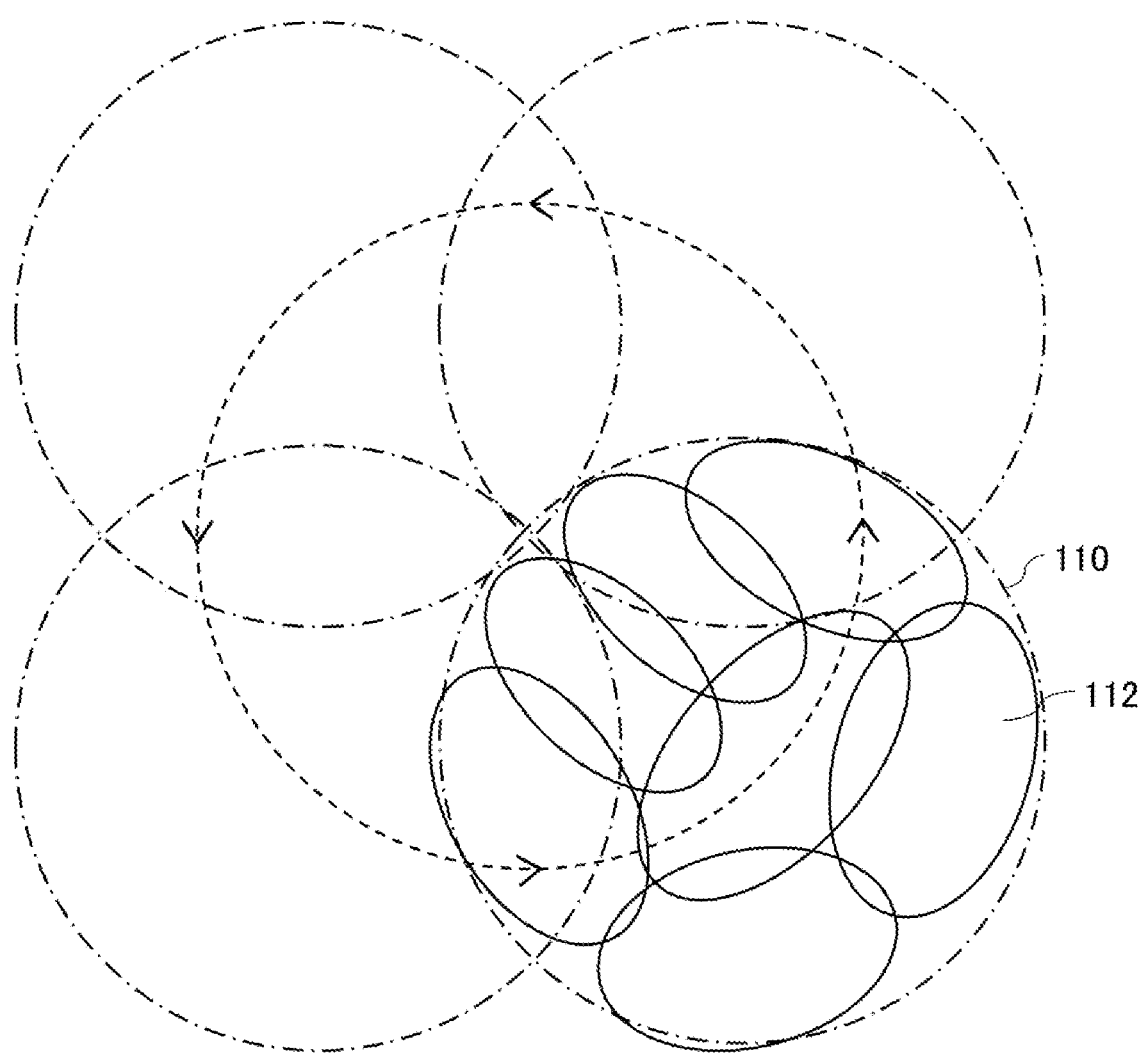
FIG. 9 schematically illustrates an example of the configuration of the plurality of sub cells 112.

FIG. 9 schematically illustrates an example of the configuration of the plurality of sub cells 112. The control device 200 may be differentiated in shape from the plurality of sub cells 112 included in one communication area 110. The control device 200 differentiates, for example, the shapes of the plurality of sub cells 112 included in the communication area 110 according to the position of the communication area 110 with respect to the flight pattern 116.

For example, in a case where the flight pattern 116 is a circular shape, the control device 200 changes the shape of the sub cell 112 closer to the center position of the flight pattern 116 among the plurality of sub cells 112 to be longer with respect to the direction away from the center position. In addition, the control device 200 changes the shape of the sub cell 112 far from the center position of the flight pattern 116 among the plurality of sub cells 112 to be longer with respect to the circumference direction of the flight pattern 116. As a result, the length in the circumference direction of the sub cell 112 moving outside the circular flight pattern 116 can be made long with respect to each of the plurality of sub cells 112. Thus, it is possible to reduce the number of handovers of the user terminal 30 as a whole.

Further, the changing of the shape of the sub cell 112 illustrated in FIG. 9 may be performed mainly by the plurality of aircrafts 100 rather than the control device 200. The aircraft 100 may change the shape of the plurality of sub cells 112 formed by the aircraft 100 according to the position of the communication area 110 with respect to the flight pattern 116.

Figure 10:
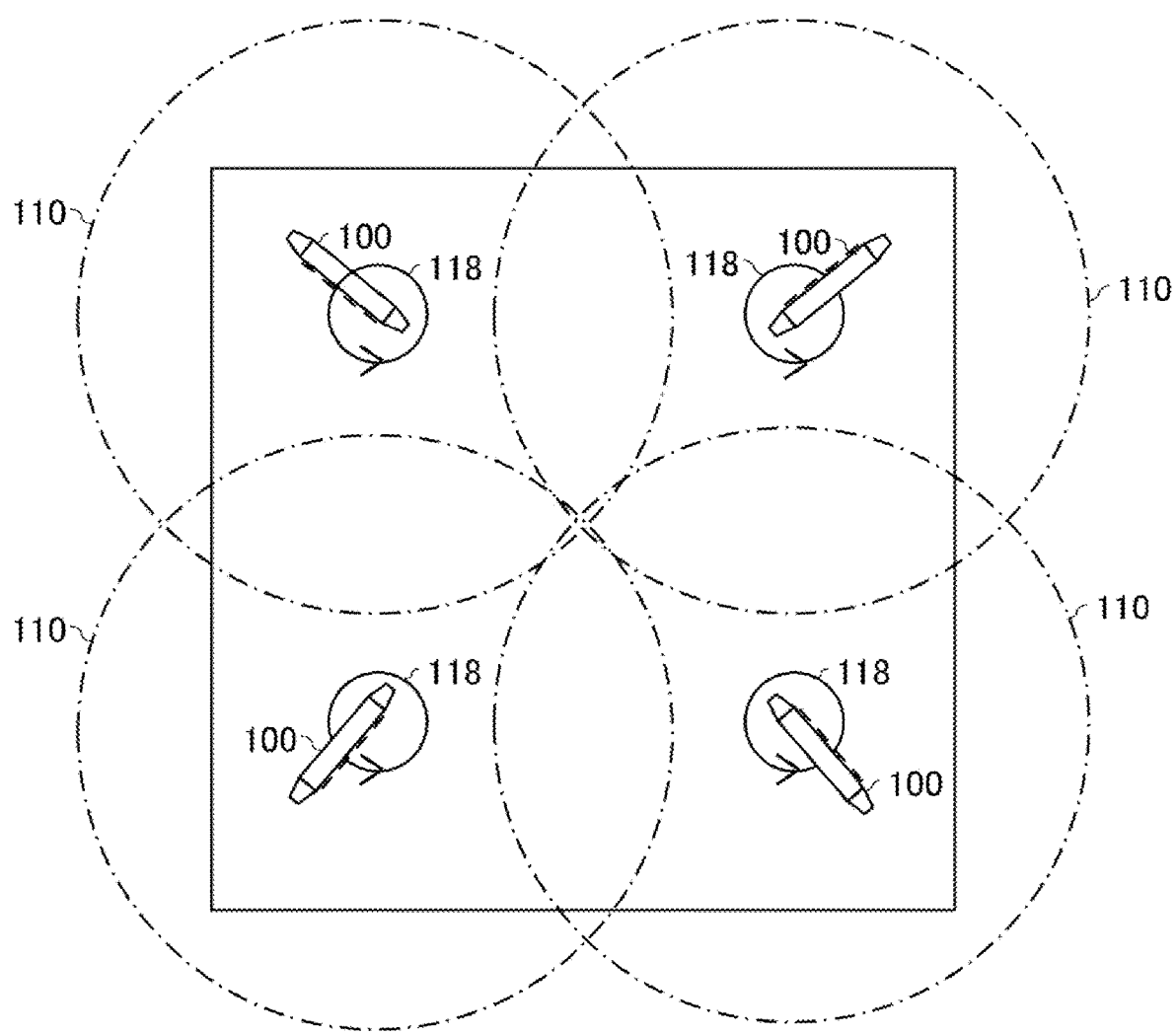
FIG. 10 schematically illustrates an example in which the plurality of aircrafts 100 fly at fixed points.

FIG. 10 schematically illustrates an example in which the plurality of aircrafts 100 fly at fixed points. The fixed-point flight of the plurality of aircrafts 100 may indicate that the target area 50 is covered without moving the communication area 110 of each of the plurality of aircrafts 100, and the plurality of communication areas 110 of the plurality of aircrafts 100 fly to cover the entire target area 50. In the case of the fixed-point flight, each of the plurality of aircrafts 100 may flies along a fixed-point flight pattern 118.

The control device 200 may switch the flight of the plurality of aircrafts 100 from the orbiting flight as illustrated in FIG. 3 to the fixed-point flight according to an arbitrary condition. The arbitrary condition may be, for example, a condition related to weather. Specifically, according to the fact that the wind speed of the area where the plurality of aircrafts 100 fly is faster than a preset threshold, the control device 200 switches the plurality of aircrafts 100 from the orbiting flight to the fixed-point flight. As a result, for example, in a case where the weather condition is changed not preferable for the orbiting flight, the circulation flight is changed to the fixed-point flight. Therefore, it is possible to keep providing the communication services properly.

Figure 11:
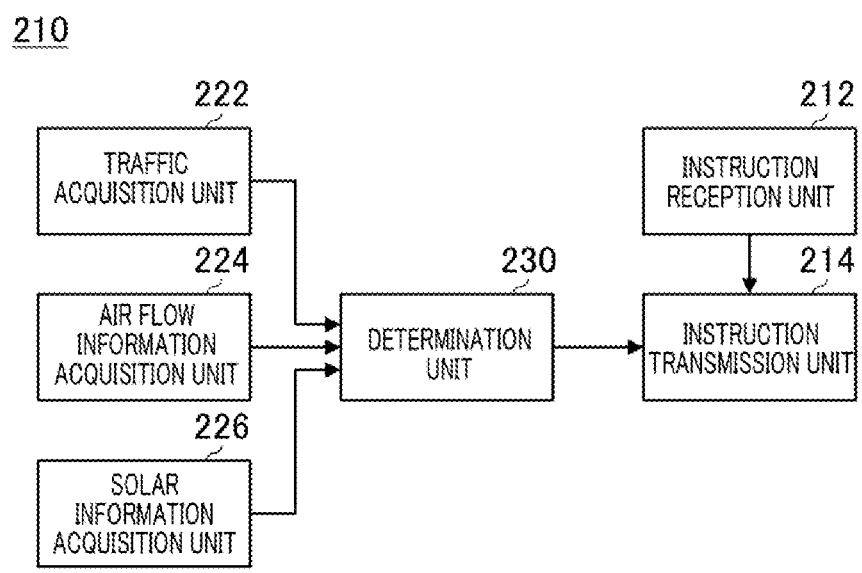
FIG. 11 schematically illustrates an example of the functional configuration of a control unit 210 of a control device 200.

FIG. 11 schematically illustrates an example of the functional configuration of a control unit 210 of the control device 200. The control unit 210 includes an instruction reception unit 212, an instruction transmission unit 214, a traffic acquisition unit 222, an air flow information acquisition unit 224, a solar information acquisition unit 226, and a determination unit 230. Further, it is not necessarily essential that the control device 200 includes all of these configurations.

The instruction reception unit 212 receives various instructions. The instruction reception unit 212 receives, for example, an instruction to instruct the target area 50. In addition, the instruction reception unit 212 receives, for example, an instruction of the flight pattern 116 of the plurality of aircrafts 100. In addition, the instruction reception unit 212 receives an instruction about the positions, speeds, and the like of the plurality of aircrafts 100. In addition, the instruction reception unit 212 receives an instruction about the positions, sizes, frequency bands, and the like of the communication areas 110 formed in the plurality of aircrafts 100.

The instruction reception unit 212 receives an instruction which is input via an operation unit provided in the control device 200. In addition, the instruction reception unit 212 may receive an instruction received via the network 20 through a communication unit provided in the control device 200.

The instruction transmission unit 214 transmits the instruction received by the instruction reception unit 212 to the aircraft 100. The instruction transmission unit 214 may transmit an instruction to the plurality of aircrafts 100. In addition, the instruction transmission unit 214 transmits an instruction to one aircraft 100 among the plurality of aircrafts 100. The aircraft 100 may transmit the instruction to the other aircrafts 100.

The traffic acquisition unit 222 acquires the communication traffic in the target area 50. The traffic acquisition unit 222 may acquire the communication traffic in the communication of the plurality of user terminals 30 in the target area 50. The traffic acquisition unit 222 receives the communication traffic of the target area 50 regularly from, for example, a monitoring device which is disposed in the network 20 to monitor the communication traffics in every location.

The air flow information acquisition unit 224 acquires air flow information which indicates the state of the air flow in the flight area where the aircraft 100 is flying. The air flow information acquisition unit 224 receives the air flow information via the network 20 from, for example, an air flow management device which manages the air flow of each area in the sky. In addition, for example, in a case where the aircraft 100 has a function of measuring the state of the ambient air flow, the air flow information acquisition unit 224 may receive the air flow information from any of the plurality of aircrafts 100.

The solar information acquisition unit 226 acquires solar position information which indicates the position of the sun. In addition, the solar information acquisition unit 226 acquires information which indicates the relative position between the positions of the plurality of aircrafts 100 and the position of the sun. The solar information acquisition unit 226 generates, for example, information indicating the relative position from the position of the sun at every registered date and time and the position information received from the plurality of aircrafts 100.

The determination unit 230 determines a control content of the aircraft 100 on the basis of various information. The determination unit 230 may determine the control content of the aircraft 100 on the basis of various information while the plurality of aircrafts 100 fly in formation. In a case where the determination unit 230 determines the control content of the aircraft 100, the instruction transmission unit 214 transmits the determined control content to the aircraft 100.

The determination unit 230 determines, for example, the control content of the aircraft 100 on the basis of the communication traffic acquired by the traffic acquisition unit 222. Specifically, in a case where the communication traffic of the target area 50 is higher than a preset threshold, the determination unit 230 determines to make another aircraft 100 participate in the formation flight of the plurality of aircrafts 100. In a case where the determination unit 230 has made the determination, the instruction transmission unit 214 transmits an instruction directed to the plurality of aircrafts 100 and the other aircraft 100 causing the other aircraft 100 participate in the formation flight, and instructions for the flight pattern 116 in a case where the participation is allowed, the arrangement of the other aircraft 100, the flight speeds of the plurality of aircrafts 100 and the other aircraft 100, the shapes of the communication areas 110 of the plurality of aircrafts 100 and the other aircraft 100, and the like to the plurality of aircrafts 100 and the other aircraft 100.

In addition, for example, in a case where the communication traffic of a specific partial area in the target area 50 is heavier than the other areas, and the communication traffic is larger than a preset threshold, the determination unit 230 determines to make the flight speed of the aircraft 100 covering the specific area among the plurality of aircrafts 100 slower than those of the aircrafts 100 covering the other areas. The instruction transmission unit 214 transmits an instruction to the aircraft 100 of which the flight speed is determined by the determination unit 230 to be made slower. The communication timing may be before the communication area 110 of the aircraft 100 reaches the specific area, or may be at the timing when the communication area 110 of the aircraft 100 reaches the specific area.

In addition, for example, in a case where the communication traffic of a specific partial area in the target area 50 is heavier than the other areas, and the communication traffic is larger than a preset threshold, the determination unit 230 determines to make the size of the communication area 110 of the aircraft 100 covering the specific area among the plurality of aircrafts 100 smaller. The instruction transmission unit 214 transmits an instruction to the aircraft 100 of which the size of the communication area 110 is determined by the determination unit 230 to be made smaller. The communication timing may be before the communication area 110 of the aircraft 100 reaches the specific area, or may be at the timing when the communication area 110 of the aircraft 100 reaches the specific area.

In addition, for example, in a case where the communication traffic of a specific partial area in the target area 50 is heavier than the other areas, and the communication traffic is larger than a preset threshold, the determination unit 230 determines to change the shape of the communication area 110 of the aircraft 100 covering the specific area among the plurality of aircrafts 100. The instruction transmission unit 214 transmits an instruction to the aircraft 100 of which the shape of the communication area 110 is determined by the determination unit 230 to be changed. The communication timing may be before the communication area 110 of the aircraft 100 reaches the specific area, or may be at the timing when the communication area 110 of the aircraft 100 reaches the specific area.

In addition, the determination unit 230 determines the control content of the aircraft 100 on the basis of the air flow information acquired by the air flow information acquisition unit 224. For example, in a case where the air flow of the flight area where the plurality of aircrafts 100 fly has been changed, the determination unit 230 determines to change the flight pattern 116 of the plurality of aircrafts 100 according to the change. For example, the determination unit 230 determines to change the flight pattern 116 of the plurality of aircrafts 100 in order to avoid the area where the wind speed is higher than a preset threshold among the flight areas where the plurality of aircrafts 100 fly. In addition, the determination unit 230 stores the flight pattern 116 for every air flow situation in advance, and determines to change the flight pattern 116 of the plurality of aircrafts 100 to the flight pattern 116 corresponding to the air flow situation indicated by the air flow information which is acquired by the air flow information acquisition unit 224. In a case where the determination unit 230 determines to change the flight pattern 116, the instruction transmission unit 214 notifies the plurality of aircrafts 100 of the changed flight pattern 116.

In addition, the determination unit 230 may determine the flight of the plurality of aircrafts 100, which performs an orbiting flight, to switch from the orbiting flight to the fixed-point flight according to the weather condition. For example, in a case where it is determined that the wind speed of the flight area where the plurality of aircrafts 100 fly based on the air flow information acquired by the air flow information acquisition unit 224 is stronger than a preset threshold, the determination unit 230 determines to switch the flight from the orbiting flight to the fixed-point flight. In a case where the determination has been made by the determination unit 230, the instruction transmission unit 214 transmits an instruction to switch the flight from the orbiting flight to the fixed-point flight for the plurality of aircrafts 100. The determination unit 230 may determine to switch the flight from the fixed-point flight to the orbiting flight according to the weather condition after switching to the fixed-point flight. For example, in a case where the wind speed of the flight area where the plurality of aircrafts 100 fly is lower than the preset threshold, the determination unit 230 determines to switch the flight from the fixed-point flight to the orbiting flight. In a case where the determination has been made by the determination unit 230, the instruction transmission unit 214 transmits an instruction to switch the flight from the fixed-point flight to the orbiting flight for the plurality of aircrafts 100.

In addition, the determination unit 230 determines the control content of the aircraft 100 on the basis of the solar information acquired by the solar information acquisition unit 226. The determination unit 230 stores, for example, the flight pattern 116 in advance at every relative position between the positions of the plurality of aircrafts 100 and the position of the sun, and determines to change the flight pattern 116 of the plurality of aircrafts 100 to the flight pattern 116 corresponding to the relative position indicated by the solar information which is acquired by the solar information acquisition unit 226. In a case where the determination unit 230 determines to change the flight pattern 116, the instruction transmission unit 214 notifies the plurality of aircrafts 100 of the changed flight pattern 116.

In addition, the determination unit 230 may determine to differentiate the shape of the plurality of sub cells 112 included in one communication area 110 which is formed by one aircraft 100 among the plurality of aircrafts 100. The determination unit 230 determines to differentiate the shape of the plurality of sub cells 112, for example, according to the position where one aircraft 100 is flying. Specifically, the determination unit 230 determines to differentiate the shape of the plurality of sub cells 112 according to the position of the communication area 110 with respect to the flight pattern 116. In a case where the determination unit 230 determines to differentiate the shape of the plurality of sub cells 112, the instruction transmission unit 214 transmits an instruction to the aircraft 100.

In addition, the determination unit 230 may determine to construct a virtual cell in two or more sub cells 112 depending on the moving direction of the two or more sub cells 112 among the plurality of sub cells 112 included in one communication area 110 which is formed by one aircraft 100 among the plurality of aircrafts 100. In a case where the determination unit 230 determines to construct a virtual cell, the instruction transmission unit 214 transmits an instruction to the aircraft 100.

In addition, the determination unit 230 may determine to construct the virtual cell in the sub cell 112 in the first communication area 110 and the sub cell 112 in the second communication area 110 depending on the moving direction of the sub cell 112 in the first communication area 110 by the first aircraft 100 among the plurality of aircrafts 100 and the sub cell 112 in the second communication area 110 by the second aircraft 100 among the plurality of aircrafts 100. In a case where the determination unit 230 determines to construct a virtual cell, the instruction transmission unit 214 transmits an instruction to the first aircraft 100 and the second aircraft 100.

Figure 12:
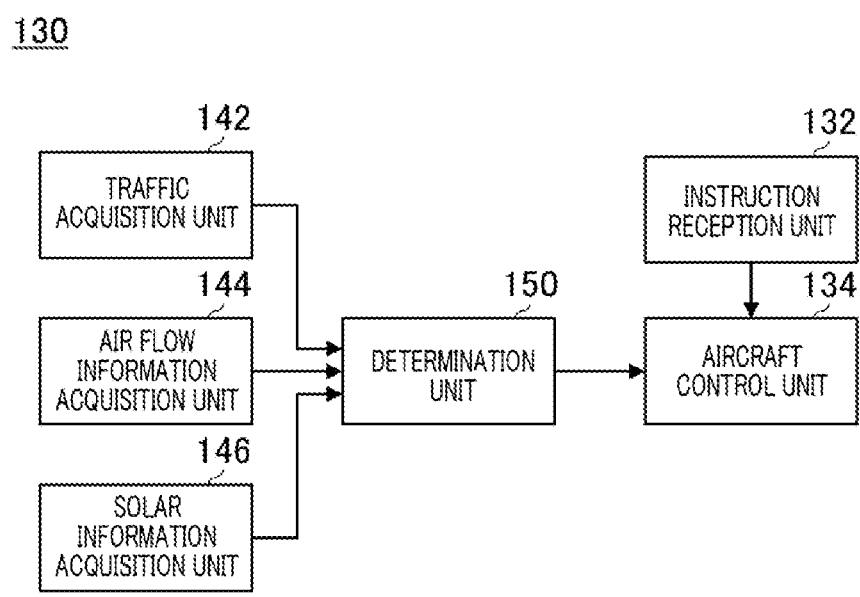
FIG. 12 schematically illustrates an example of the functional configuration of a control unit 130 of the aircraft 100.

FIG. 12 schematically illustrates an example of the functional configuration of a control unit 130 of the aircraft 100. The control unit 130 includes an instruction reception unit 132, an aircraft control unit 134, a traffic acquisition unit 142, an air flow information acquisition unit 144, a solar information acquisition unit 146, and a determination unit 150. Further, it is not necessarily essential that the control unit 130 includes all of these configurations.

The instruction reception unit 132 receives various instructions from the control device 200. The instruction reception unit 132 receives, for example, an instruction to instruct the target area 50. In addition, the instruction reception unit 132 receives, for example, an instruction of the flight pattern 116. In addition, the instruction reception unit 132 receives an instruction about a flight position, a flight speed, and the like. In addition, the instruction reception unit 132 receives an instruction about the position, size, frequency band, and the like of the communication area 110.

The aircraft control unit 134 controls the aircraft 100 according to the instruction received by the instruction reception unit 132. The aircraft control unit 134 may control the flight of the aircraft 100. In addition, the aircraft control unit 134 may control the antenna 108 of the aircraft 100. The aircraft control unit 134 controls the flight position and flight speed of the aircraft 100, and the position, size, frequency band, and the like of the communication area 110 according to the instruction received by the instruction reception unit 132.

The traffic acquisition unit 142 acquires the communication traffic in the target area 50. The traffic acquisition unit 142 may acquire the communication traffic in the communication of the plurality of user terminals 30 in the target area 50. The traffic acquisition unit 142 receives, for example, the communication traffic of the target area 50 from the control device 200. In addition, the traffic acquisition unit 142 receives the communication traffic of the target area 50 from, for example, a monitoring device which is disposed in the network 20 to monitor the communication traffics in every location.

The air flow information acquisition unit 144 acquires air flow information which indicates the state of the air flow in the flight area where the aircraft 100 is flying. The air flow information acquisition unit 224 receives the air flow information via the network 20 from, for example, an air flow management device which manages the air flow of each area in the sky. In addition, for example, in a case where the aircraft 100 has a function of measuring the state of the ambient air flow, the air flow information acquisition unit 224 may acquire the air flow information measured by the aircraft 100.

The solar information acquisition unit 146 acquires solar position information which indicates the position of the sun. In addition, the solar information acquisition unit 226 acquires information which indicates the relative position between the positions of the plurality of aircrafts 100 and the position of the sun. The solar information acquisition unit 146 generates, for example, information indicating the relative position from the position of the sun at every pre-registered date and time and the position information received from the plurality of aircrafts 100.

The determination unit 150 determines a control content of the aircraft 100 on the basis of various information. In a case where the determination unit 150 determines the control content of the aircraft 100, the aircraft control unit 134 controls the aircraft 100 according to the determined control content.

The determination unit 150 determines, for example, the control content of the aircraft 100 on the basis of the communication traffic acquired by the traffic acquisition unit 142. For example, in a case where the communication traffic of a specific partial area in the target area 50 is heavier than the other areas, and the communication traffic is larger than a preset threshold, the determination unit 150 determines to set the flight speed of the aircraft 100 when covering the specific area to be slower than when covering another area. In a case where the determination has been made by the determination unit 150, the aircraft control unit 134 controls the aircraft 100 to have a flight speed which is preset as the flight speed when covering the specific area.

In addition, in a case where the communication traffic of a specific partial area in the target area 50 is heavier than the other areas, and the communication traffic is larger than a preset threshold, the determination unit 150 determines, for example, to set the size of the communication area 110 when covering the specific area to be smaller than that when covering another area. In a case where the determination has been made by the determination unit 150, the aircraft control unit 134 controls the aircraft 100 such that the size of the communication area 110 becomes a preset size as the size of the communication area 110 when covering the specific area.

In addition, in a case where the communication traffic of a specific partial area in the target area 50 is heavier than the other areas, and the communication traffic is larger than a preset threshold, the determination unit 150 determines, for example, to set the shape of the communication area 110 when covering the specific area to be different from that when covering another area. In a case where the determination has been made by the determination unit 150, the aircraft control unit 134 controls the aircraft 100 such that the shape of the communication area 110 becomes a preset shape as the shape of the communication area 110 when covering the specific area.

In addition, the determination unit 150 determines the control content of the aircraft 100 on the basis of the air flow information acquired by the air flow information acquisition unit 144. For example, in a case where the air flow of the flight area where the aircraft 100 flies has been changed, the determination unit 150 determines to change the flight pattern 116 of the aircraft 100 according to the change. For example, the determination unit 150 determines to change the flight pattern 116 of the aircraft 100 in order to avoid the area where the wind speed is higher than a preset threshold among the flight areas where the aircraft 100 flies. In addition, the determination unit 150 stores the flight pattern 116 for every air flow situation in advance, and determines to change the flight pattern 116 of the aircraft 100 to the flight pattern 116 corresponding to the air flow situation indicated by the air flow information which is acquired by the air flow information acquisition unit 144. In a case where the determination has been made by the determination unit 150, the aircraft control unit 134 controls the aircraft 100 to fly in the determined flight pattern 116.

In addition, the determination unit 150 may determine the flight of the aircraft 100, which performs an orbiting flight, to switch from the orbiting flight to the fixed-point flight according to the weather condition. For example, in a case where it is determined that the wind speed of the flight area where the aircraft 100 flies based on the air flow information acquired by the air flow information acquisition unit 144 is stronger than a preset threshold, the determination unit 150 determines to switch the flight from the orbiting flight to the fixed-point flight. In a case where the determination has been made by the determination unit 150, the aircraft control unit 134 notifies the other aircrafts 100 of the fact, and controls the aircraft 100 in order to switch the flight of the aircraft 100 thereof from the orbiting flight to the fixed-point flight.

In addition, the determination unit 150 determines the control content of the aircraft 100 on the basis of the solar information acquired by the solar information acquisition unit 146. The determination unit 150 stores, for example, the flight pattern 116 in advance at every relative position between the position of the aircraft 100 and the position of the sun, and determines to change the flight pattern 116 of the aircraft 100 to the flight pattern 116 corresponding to the relative position indicated by the solar information which is acquired by the solar information acquisition unit 146. In a case where the changing of the flight pattern 116 has been determined by the determination unit 230, the aircraft control unit 134 controls the aircraft 100 to fly in the determined flight pattern 116.

In addition, the determination unit 150 may determine to differentiate the shape of the plurality of sub cells 112 which are included in the communication area 110. The determination unit 150 determines to differentiate the shape of the plurality of sub cells 112, for example, according to the position where the aircraft 100 is flying. Specifically, the determination unit 150 determines to differentiate the shape of the plurality of sub cells 112 according to the position of the communication area 110 with respect to the flight pattern 116. In a case where the determination has been made by the determination unit 150, the aircraft control unit 134 controls the antenna 108 of the aircraft 100 in order to differentiate the shape of the plurality of sub cells 112.

In addition, the determination unit 150 may determine to construct a virtual cell in two or more sub cells 112 depending on the moving direction of the two or more sub cells 112 among the plurality of sub cells 112 included in the communication area 110. In a case where the determination has been made by the determination unit 230, the aircraft control unit 134 controls the antenna 108 of the aircraft 100 in order to construct a virtual cell in the two or more sub cells 112.

In addition, the determination unit 150 may determine to construct the virtual cell in these sub cells 112 depending on the moving direction of the sub cell 112 in the communication area 110 by the aircraft 100 and the sub cell 112 in the communication area 110 by the other aircraft 100. In a case where the determination unit 150 has determined to construct the virtual cell, the aircraft control unit 134 communicates with the other aircraft 100 to set the frequency band assigned to the sub cell 112 formed by its own and the sub cell 112 formed by the other aircraft 100 to be equal, and switches the frequency band to be assigned to the sub cell 112 formed by its own.

Figure 13:
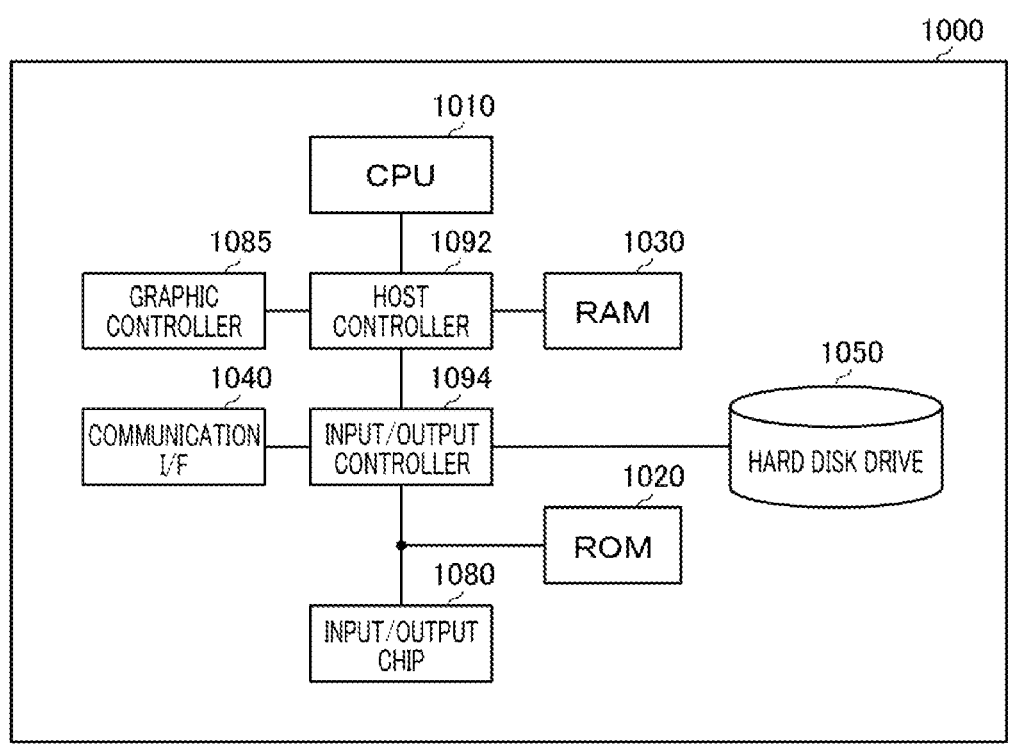
FIG. 13 schematically illustrates an example of the hardware configuration of a computer 1000 which functions as the control device 200.

FIG. 13 schematically illustrates an example of a computer 1000 which functions as the control device 200. The computer 1000 according to this embodiment includes CPU peripheral parts which include a CPU 1010, a RAM 1030, and a graphic controller 1085 which are connected to each other by a host controller 1092, and an input/output unit which includes a ROM 1020, a communication I/F 1040, a hard disk drive 1050, and an input/output chip 1080 which are connected to the host controller 1092 by an input/output controller 1094.

The CPU 1010 operates based on a program stored in the ROM 1020 and the RAM 1030, and controls the parts. The graphic controller 1085 acquires image data generated on a frame buffer which is provided in the RAM 1030 by the CPU 1010, and displays the data on the display. Alternatively, the graphic controller 1085 may include the frame buffer for storing the image data generated by the CPU 1010 or the like inside thereof. The communication I/F 1040 communicates with other devices via a wired or wireless network. In addition, the communication I/F 1040 functions as hardware for communication. The hard disk drive 1050 stores a program and data which are used by the CPU 1010.

The ROM 1020 stores a boot program executed when the computer 1000 starts up and a program depending on the hardware of the computer 1000. The input/output chip 1080 connects, for example, various input/output devices to the input/output controller 1094 via a parallel port, a serial port, a keyboard port, a mouse port, and the like.

The program provided to the hard disk drive 1050 via the RAM 1030 is stored in a recording medium such as an IC card and provided by a user. The program is read out from the recording medium, installed in the hard disk drive 1050 via the RAM 1030, and executed in the CPU 1010.

The program, which is installed in the computer 1000 and makes the computer 1000 function as the control device 200, may work on the CPU 1010 and the like to make the computer 1000 respectively function as the parts of the control device 200. Information processing described in these programs is read to the computer 1000 so as to function as the instruction reception unit 212, the instruction transmission unit 214, the traffic acquisition unit 222, the air flow information acquisition unit 224, the solar information acquisition unit 226, and the determination unit 230 which are specific examples in cooperation with software and the various hardware resources. Then, with these specific examples, the information is calculated or modified according to an application of the computer 1000 in this embodiment. Therefore, a unique control device 200 is constructed according to the application.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20 network, 22 gateway, 50 target area, 52 high traffic area, 100 aircraft, 102 main body, 104 propeller, 106 solar cell panel, 108 antenna, 110 communication area, 112 sub cell, 114 virtual cell, 116 flight pattern, 118 fixed-point flight pattern, 120 aircraft, 130 control unit, 132 instruction reception unit, 134 aircraft control unit, 142 traffic acquisition unit, 144 air flow information acquisition unit, 146 solar information acquisition unit, 150 determination unit, 200 control device, 210 control unit, 212 instruction reception unit, 214 instruction transmission unit, 222 traffic acquisition unit, 224 air flow information acquisition unit, 226 solar information acquisition unit, 230 determination unit, 1000 computer, 1010 CPU, 1020 ROM, 1030 RAM, 1040 communication I/F, 1050 hard disk drive, 1080 input/output chip, 1085 graphic controller, 1092 host controller, 1094 input/output controller.

What is claimed is:

1. A control device for forming a communication coverage area on a ground, the control device configured to control each of a plurality of aircrafts each having an antenna for providing a radio communication service to a respective plurality of user terminals in a communication area within the communication coverage area, the control device comprising:
a control unit that makes the plurality of aircrafts perform a formation flight, and controls the plurality of aircrafts such that the communication area of each of the plurality of aircrafts moves while covering a respective part of a preset target area, and an entire area of the preset target area is covered by the plurality of the communication areas of the plurality of aircrafts,
wherein the control unit is configured to make a flight speed of an aircraft, among the plurality of aircrafts, which is covering the respective part of the preset target area in which a communication traffic of the respective plurality of user terminals is larger than communication traffic of the respective plurality of user terminals covered by remaining ones of the plurality of the communication areas, slower than flight speeds of remaining aircrafts among the plurality of aircrafts.

2. The control device according to claim 1,
wherein the control unit reduces an area size of the communication area of the aircraft, among the plurality of aircrafts, which is covering the area in the target area in which the communication traffic of the plurality of user terminals is larger than the other areas.

3. The control device according to claim 1,
wherein the control unit changes a shape of the communication area of the aircraft, among the plurality of aircrafts, which is covering the area in the target area in which the communication traffic of the plurality of user terminals is larger than the other areas.

4. The control device according to claim 1,
wherein the control unit makes an aircraft other than the plurality of aircrafts participate in the formation flight being performed by the plurality of aircrafts according to a preset condition being satisfied while the plurality of aircrafts cover the entire target area.

5. The control device according to claim 1,
wherein the control unit changes a flight pattern of the plurality of aircrafts according to a change in an air flow in a flight area where the plurality of aircrafts are flying.

6. The control device according to claim 1,
wherein the control unit changes a flight pattern of the plurality of aircrafts according to a relative position between positions of the plurality of aircrafts and a position of the sun.

7. The control device according to claim 1,
wherein the control unit switches a flight of the plurality of aircrafts performing a formation flight, according to a weather condition, to a fixed-point flight in which the plurality of aircrafts fly, such that a part of the target area is covered without moving the communication area of each of the plurality of aircrafts and the plurality of communication areas of the plurality of aircrafts cover the entire target area.

8. The control device according to claim 1,
wherein the communication coverage area is configured by a plurality of sub cells, and
wherein the control unit constructs virtual cells in two or more of the plurality of sub cells along a moving direction of the two or more of the plurality of sub cells in one of the plurality of the communication areas.

9. The control device according to claim 1,
wherein the communication coverage area is configured by a plurality of sub cells, and
wherein the control unit constructs a virtual cell in a sub cell in a first of the plurality of communication areas and a sub cell in a second of the plurality of communication areas along a moving direction of the sub cell in the first of the plurality of communication areas by a first aircraft among the plurality of aircrafts and the sub cell in the second of the plurality of communication areas by a second aircraft among the plurality of aircrafts.

10. A control device for forming a communication coverage area on a ground to control an aircraft having an antenna for providing a radio communication service to a plurality of user terminals in a communication area within the communication coverage area, the control device comprising:
a control unit that makes a plurality of aircrafts perform a formation flight, and controls the plurality of aircrafts such that the communication area of each of the plurality of aircrafts moves while covering a respective part of a preset target area, and an entire area of the preset target area is covered by a plurality of the communication areas of the plurality of aircrafts, wherein the control unit is configured to reduce an area size of the communication area of an aircraft, among the plurality of aircrafts, which is covering the respective part of the preset target area in which a communication traffic of the respective plurality of user terminals is larger than communication traffic of the respective plurality of user terminals covered by remaining ones of the plurality of the communication areas.

11. A control device for forming a communication coverage area on a ground to control an aircraft having an antenna for providing a radio communication service to a plurality of user terminals in a communication area within the communication coverage area, the control device comprising:

a control unit that makes a plurality of aircrafts perform a formation flight, and controls the plurality of aircrafts such that the communication area of each of the plurality of aircrafts moves while covering a respective part of a preset target area, and an entire area of the preset target area is covered by a plurality of the communication areas of the plurality of aircrafts, wherein the control unit is configured to make an aircraft other than the plurality of aircrafts participate in the formation flight being performed by the plurality of aircrafts according to a preset condition being satisfied while the plurality of aircrafts cover the entire area of the preset target area.

12. The control device according to claim 11, wherein the preset condition is that a communication traffic in the target area is higher than a preset threshold.

13. A control device for forming a communication coverage area on a ground to control an aircraft having an antenna for providing a radio communication service to a plurality of user terminals in a communication area within the communication coverage area, the control device comprising:

a control unit that makes a plurality of aircrafts perform a formation flight, and controls the plurality of aircrafts such that the communication area of each of the plurality of aircrafts moves while covering a respective part of a preset target area, and an entire area of the preset target area is covered by a plurality of the communication areas of the plurality of aircrafts, wherein the control unit is configured to change a flight pattern of the plurality of aircrafts according to a change in an air flow in a flight area where the plurality of aircrafts are flying.

14. A control device for forming a communication coverage area on a ground to control an aircraft having an antenna for providing a radio communication service to a plurality of user terminals in a communication area within the communication coverage area, the control device comprising:

a control unit that makes a plurality of aircrafts perform a formation flight, and controls the plurality of aircrafts such that the communication area of each of the plurality of aircrafts moves while covering a respective part of a preset target area, and an entire area of the preset target area is covered by a plurality of the communication areas of the plurality of aircrafts, wherein the control unit is configured to change a flight pattern of the plurality of aircrafts according to a relative position between positions of the plurality of aircrafts and a position of the sun.

15. A non-transitory computer readable storage medium having stored therein a computer program for causing a control device to control each of a plurality of aircrafts each having an antenna for forming a communication coverage area on a ground to provide a radio communication service to a respective plurality of user terminals in a communication area within the communication coverage area, to function as a control unit which makes the plurality of aircrafts fly in a formation flight, wherein the control unit controls the plurality of aircrafts such that the communication area of each of the plurality of aircrafts moves while covering a respective part of a preset target area, and an entire area of the preset target area is covered by the plurality of the communication areas of the plurality of aircrafts, and makes a flight speed of an aircraft, among the plurality of aircrafts, which is covering the respective part of the preset target area in which a communication traffic of the respective plurality of user terminals covered by the aircraft is larger than the communication traffic of the respective plurality of user terminals covered by remaining ones of the plurality of the communication areas, slower than flight speeds of remaining aircrafts among the plurality of aircrafts.

16. An aircraft for forming a communication coverage area on a ground to provide a radio communication service to a plurality of user terminals in a communication area within the communication coverage area, the aircraft comprising:

an aircraft; and a control unit that controls the aircraft such that a communication coverage area on a ground of each of a plurality of aircrafts which include the aircraft moves while covering a respective part of a preset target area covered by the plurality of aircrafts, a plurality of the communication areas of the plurality of aircrafts cover an entire area of the preset target area, and the plurality of aircrafts perform formation flight, wherein the control unit is adapted to change a flight pattern of the aircraft according to a change in an air flow in a flight area where the aircraft is flying.

* * * * *